Jan. 28, 1941. R. G. LE TOURNEAU 2,229,753
DOUBLE CONE CLUTCH AND BRAKE MECHANISM
Filed July 12, 1939

INVENTOR
R. G. LeTourneau

BY
ATTORNEY

Patented Jan. 28, 1941

2,229,753

UNITED STATES PATENT OFFICE 2,229,753

DOUBLE CONE CLUTCH AND BRAKE MECHANISM

Robert G. Le Tourneau, Peoria, Ill., assignor to R. G. Le Tourneau, Inc., a corporation of California Application July 12, 1939, Serial No. 284,001

2 Claims. (Cl. 192—17)

This invention relates to cone clutches, and particularly to a double cone clutch of the type featured in my copending application Serial No. 284,002, filed July 12, 1939.

In the present invention, the general principle and fundamental features of construction and operation of the clutch structure are the same as in said copending application, but with certain simplifications, and with a reversal of the male and female clutch elements relative to the drive and driven shafts.

An object of this invention is to arrange one of the clutch elements as a flywheel, thus eliminating the need of a separate flywheel attached to the engine and reducing the number and weight of parts of the structure as a whole.

Another object is to provide a simplified form of clutch brake acting to reduce the speed of the driven shaft when the clutch is disengaged.

These objects I accomplish by means of such structure and relative arrangement of parts as will fully appear by a perusal of the following specification and claims.

In the drawing similar characters of reference indicate corresponding parts in the several views.

Figure 1:
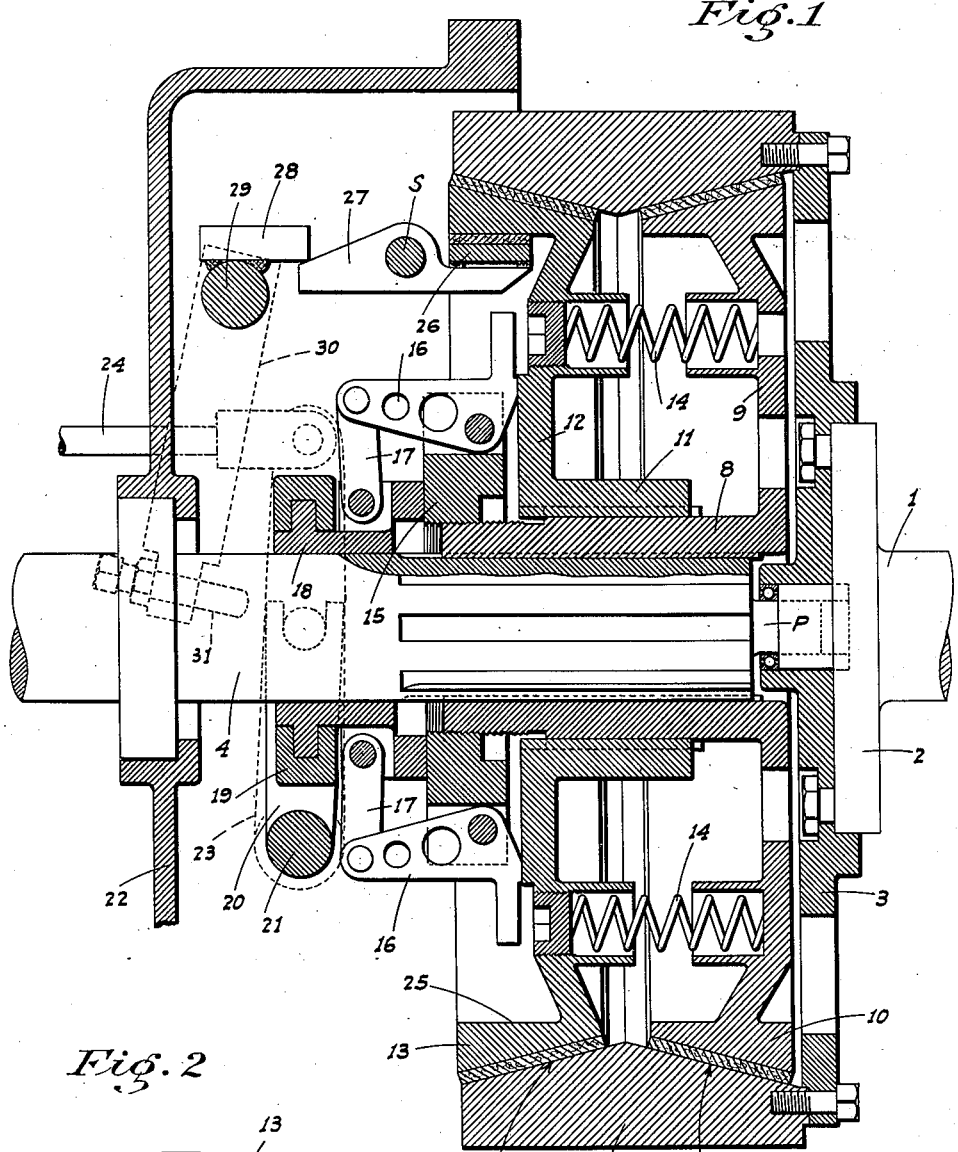
Figure 1 is a sectional elevation of the clutch with the clutch elements engaged.
Figure 2:
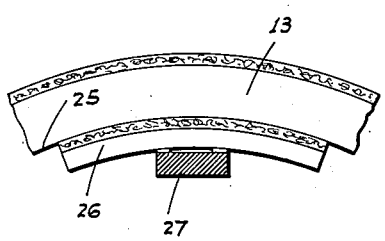
Figure 2 is a fragmentary face view of one of the male clutch elements showing the brake band associated therewith.

Referring now more particularly to the characters of reference on the drawing, 1 denotes the engine or drive shaft having a flange 2 on its rear end on which a disc 3 is secured. The driven shaft 4 is alined with and extends rearwardly from shaft 1, its forward end being piloted in the disc as at P. Secured on disc 3 in overhanging relation to and concentric with shaft 4 is a heavy band 5 of sufficient weight to serve as a flywheel. The band also forms the female clutch member, its inner periphery being provided with opposed bevel or taper surfaces or seats 6 and 7 for the male cone elements. Slidably splined on the forward portion of shaft 4 is a sleeve 8 carrying on its forward end a spider 9 having a male cone element 10 secured thereon which cooperates with seat 6 in the female member 5. Slidably splined on the sleeve intermediate its ends is the hub 11 of another spider 12 on which a male cone element 13 is mounted, which cooperates with the seat 7 in the female member 5. Compression springs 14 between the spiders tend to force the male clutch elements apart so as to disengage them from the female member.

The elements are forced together or positively moved apart by mechanism substantially the same as in the copending application, and comprises a collar 15 adjustably mounted on sleeve 8 rearwardly of spider 12, fingers 16 pivoted on said collar to engage and force spider 11 toward the spider 9, links 17 pivoted on the fingers, and a throw-out collar 18 slidable on shaft 4 rearwardly of sleeve 8. The collar 18 turns in a yoke 19, which is engaged on opposite sides by a shifting fork 20 mounted on a transverse shaft 21 extending under shaft 4. The shaft 21 is journaled in the clutch casing 22, and outside the casing is connected to an arm 23 to which a push and pull rod 24 or other actuating means is applied.

The clutch element 13, rearwardly of its supporting spider 12 is provided with an annular surface 25 forming an internal brake drum. This drum at the top is engaged by an arcuate brake band or shoe 26 supported centrally of its extent by a lever 27 extending rearwardly from said band and pivotally supported intermediate its ends in casing 22 by a shaft S parallel to shaft 21. The lever is depressed at its rear end, so as to force the band into frictional contact with the drum, by means of a lug 28 overhanging said end and mounted on a transverse shaft 29. This shaft is journaled in the casing above shaft 4, and outside the casing is secured on an arm 30 depending rearwardly of arm 23.

An adjustable set screw 31 is mounted in arm 30 substantially at right angles to the median line thereof and projects toward arm 23 to be engaged by the rear edge thereof when said arm 23 is pulled rearwardly, or in the direction necessary to throw out the clutch. The shaft 29 will thus be rotated in a direction such as will move the forward end of lug 28 down, depressing the adjacent end of lever 27 and setting the brake. The brake being applied to one of the male clutch elements, which in turn is connected to the driven shaft, the speed of the latter will be at once reduced when the clutch is disengaged, as is desirable if the clutch is used in connection with change speed gearing.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A clutch comprising, with drive and driven shafts, cooperating clutch elements mounted on the shafts, the element on the driven shaft having a brake drum rigid therewith, an arcuate brake shoe engaging the drum, a lever connected at one end on the shoe intermediate its ends and disposed substantially parallel to the shafts in a longitudinal plane, means pivoting the lever intermediate its ends in a fixed position, a transverse shaft mounted adjacent the lever, a lug projecting from the shaft to engage the other end of the lever and move the same in a brake setting direction with rotation of said shaft in one direction, and means to rotate the shaft in said direction.

2. A structure as in claim 1, in which said last named means comprises actuating means for the clutch elements including a rotatable shaft parallel to the brake setting shaft, and means between the shafts to rotate said brake setting shaft in a brake setting direction with rotation of the other shaft in a clutch disengaging direction.

ROBERT G. LE TOURNEAU.